United States Patent [19]
Feldberg

[11] Patent Number: 4,905,941
[45] Date of Patent: Mar. 6, 1990

[54] SUPPORT FOR LIGHTPOLE CABLES

[75] Inventor: Michael Feldberg, New Hope, Minn.

[73] Assignee: Lexington Standard Corporation, St. Paul, Minn.

[21] Appl. No.: 300,756

[22] Filed: Jan. 24, 1989

Related U.S. Application Data

[63] Continuation of Ser. No. 105,917, Oct. 8, 1987, abandoned.

[51] Int. Cl.$^4$ .................................... F16L 3/00
[52] U.S. Cl. .................................... 248/63; 248/303; 248/215; 248/219.2; 248/339
[58] Field of Search .............. 248/65, 303, 304, 219.4, 248/218.4, 218.1, 219.2, 215, 63, 58, 339, 340

[56] References Cited

U.S. PATENT DOCUMENTS

| | | | |
|---|---|---|---|
| 873,488 | 12/1907 | De Beaumont | 248/303 X |
| 2,949,510 | 8/1960 | Sichel | 248/303 X |
| 3,807,089 | 4/1974 | Sense | 248/219.2 X |
| 3,958,784 | 5/1976 | Bournieres | 248/303 X |

*Primary Examiner*—Alvin C. Chin-Shue

[57] ABSTRACT

A support for lightpole cables within the hollow upper portion of a lightpole which is adapted for non-slip attachment to an intermediate portion of the light cable assembly and is provided with means for positive anchoring the attachment portion to the upper end of a hollow lightpole cable for positively supporting the cable assembly within the lightpole to isolate the weight of the cable assembly from the electrical connections between the upper cable ends and the lighting fixture supported by the pole.

4 Claims, 1 Drawing Sheet

SUPPORT FOR LIGHTPOLE CABLES

This is a continuation of Ser. No. 07/105,917, filed 10.8.87, now abandoned

BACKGROUND OF THE INVENTION

It has been a problem in connection with the wiring of highway and other outside lighting fixtures to prevent the weight of a long length of wiring cable from producing tension on the electrical connections between the cable and the actual fixture supported by the supporting pole. Such lighting fixtures must be positioned at a relatively high position above the highway or other area being lighted. This necessitates long and heavy cable lengths which extend between the lighting fixture at the top of the pole and the base of the hollow pole section. These long cable lengths are heavy and if not separately supported they produce excessive and dangerous tensions in the electrical cables and also the connections thereof to the actual lighting fixtures.

SUMMARY OF THE INVENTION

The present invention relates to apparatus for providing positive support for the weight of the lengths of electrical cable extending downwardly from the top of the lightpole to the base. The invention is provided in two alternative forms. One having a single cantilevered supporting loop and the other having a symmetrically supported centrally positioned cable engaging loop.

DETAILED DESCRIPTION OF THE PREFERRED EMBODIMENT

Figure 1:
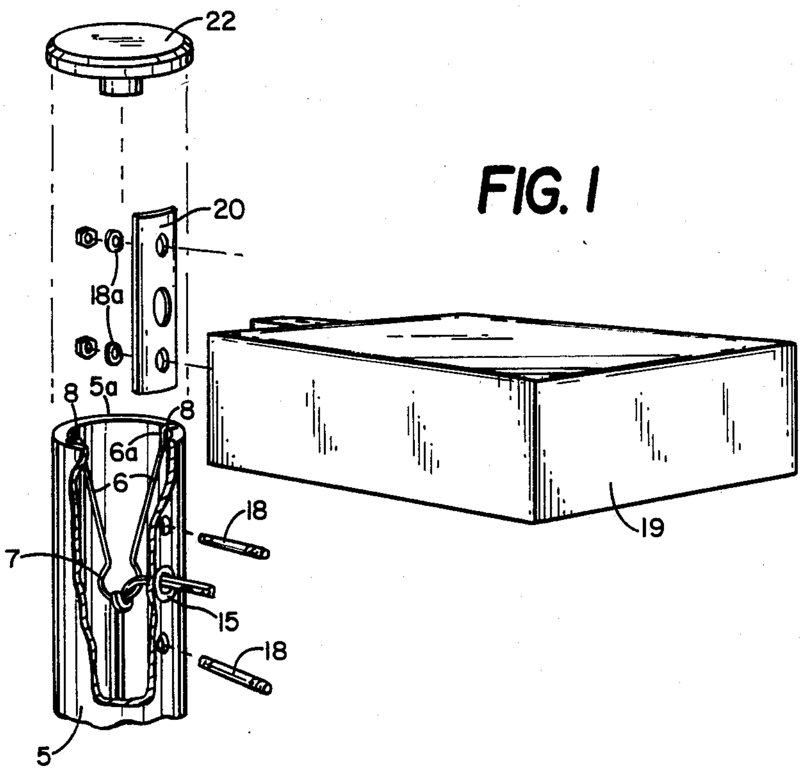
FIG. 1 is a perspective view showing a typical installation of a cable support connected in operative position at the top of a hollow lightpole showing one form of the invention.

The preferred embodiment of the invention is illustrated in FIG. 1 which shows the upper end of a lightpole 5. This cable support unit is generally V-shaped with a pair of supporting arms 6 converging downwardly and connected at their lower ends to a cable connecting loop 7. Each of the arms 6 has an attachment hook 8 at the upper end thereof. These two attachment hooks 8 engage the upper circumferential edge portion **5*a* of the lightpole 5 in diametrically opposed relation to each other as illustrated in FIG. 1 and positively support the loop 7 through the arms 6. The arms 6 are made from suitable resilient material such as heavy spring wire material and are manufactured so that the normal "set" of the generally V-shaped wire unit will produce a wider spacing between the anchoring hooks 8 than the inside diameter of the pole. In other words, when the arms 6 are inserted into the pole, the upper ends will be compressed to produce resilient pressure against opposed upper portions of the hollow pole when the arms 6 are released after insertion into the top of pole 5. The upper ends of the arms 6 are bent to form pole engaging shoulders 6*a* disposed at generally right angles to the anchoring hooks 8. This pressure engagement between the shoulders 6*a* and the inside surface portions of the pole will produce the desired stability to maintain the necessary seated support for the anchoring hooks 8**.

Figure 2:
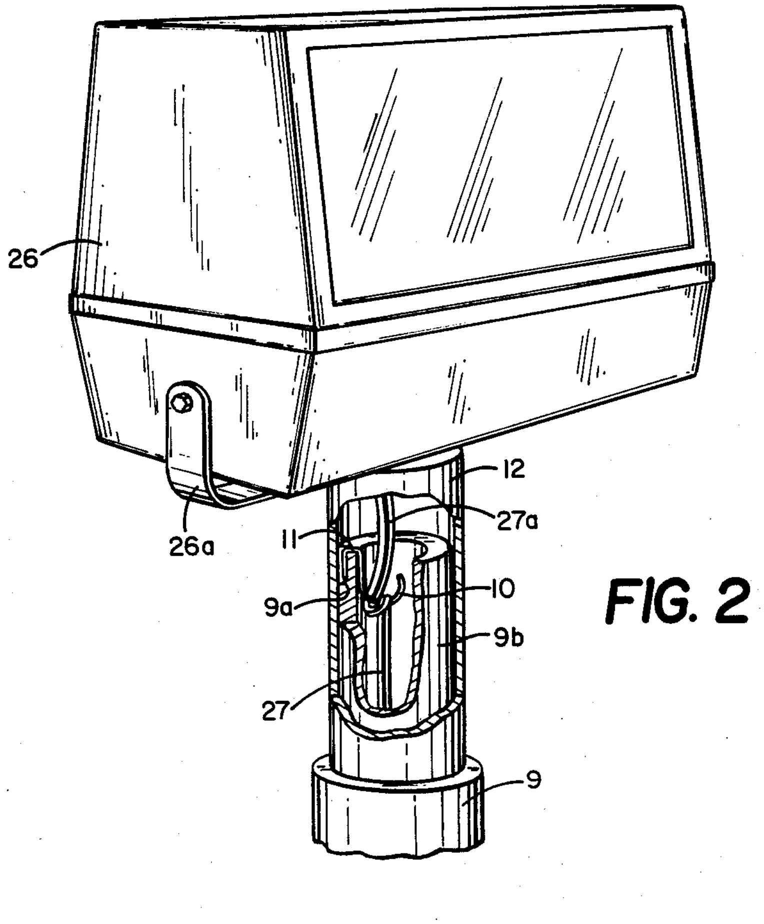
FIG. 2 is a similar view showing another form of the invention.

FIG. 2 shows a cable support unit having a single arm cantilever supported loop 10 having a generally inverted U-shaped anchoring hook 11 formed at the upper end on one side of the loop 10. In this form of the invention the upper end of the pole 9 is provided with a hook receiving slot **9*a* as illustrated to recess the hook 11 and permit attachment of the fixture mounting hub 12** as illustrated.

The wiring cable is suitably attached in non-slip relation to either of the loops 7 or 10 by either being wrapped therearound prior to attachment of the units to the upper end of the pole or in the alternative a suitable wire attachment strap (not shown) of conventional design may be provided to produce a non-slip anchoring attachment between the cable and the supporting hook.

As best shown in FIG. 1, the pole 5 is provided with a plurality of spaced apart openings in the upper end portion thereof. One of these openings is disposed at generally the same elevation as the loop 7 of the supporting unit and is provided with a grommet 15 to protect the wires 16 as they are inserted therethrough. The other two openings 17 are respectively spaced above and below the wire protecting grommet and are adapted to receive studs 18 for attaching the light fixture 19 to the pole. A backer plate 20 is placed inside the pole 5 and the studs 18 extend therethrough with suitable nuts and washers **18*a* for securing the studs to the inside of the lightpole wall. The center of the back plate 20 has a cable receiving opening therethrough sufficiently large to receive the grommet 15 therethrough when attached to the inside of the pole. The other ends of the studs 18 are attached to the lightpole in the conventional way. A top cap member 22 is mounted on the top of the pole 5** in the conventional manner.

In the form of the invention illustrated in FIG. 2, the top of the pole 9 has a reduced upper tenon portion **9*b* which is received in a top fixture mounting hub 12 to which a light fixture 26 is attached in any suitable manner such as by the lighting yoke 26*a*. The lighting cables 27 are wrapped around this hook 10 as illustrated and are supported thereby. The upper portion of cable 27 referenced by numeral 27*a* extends up through the tenon 9*b*, hub 12 and the center of yoke 26*a* and into lighting fixture 26** where the electrical connection is made in the usual manner.

What is claimed is:

1. The combination of a hollow lightpole having a top portion and a cable support inserted into the top portion of the hollow lightpole, said support including:

a cable engaging attachment portion inserted into the top portion of said hollow lightpole for permitting a non-slip attachment to a portion of an electrical lightpole cable assembly attached thereto and located within the top portion of said hollow lightpole, and a support anchoring portion connected with the cable attachment portion and including a pair of opposed outwardly extending hook elements and a pair of shoulders resiliently clamping an inside of the upper portion of said lightpole with positive attachment of said hook elements to the top of the pole to securely anchor the cable attachment portion to the inside of the upper portion of the pole, wherein said hook elements are symmetrically supported from the top portion within the hollow lightpole with the cable attachment portion disposed below said hook elements within the top hollow lightpole portion.

2. The structure set forth in claim 1 and said cable support being generally U-shaped to define a pair of resiliently compressible outwardly expandable supporting arms with said hook elements at top ends of the U-shaped portions.

3. The structure set forth in claim 2 wherein said supporting arms include a pair of shoulders at upper portions thereof immediately below the hook elements.

4. The structure set forth in claim 2 wherein said hook elements terminate at their outer ends substantially adjacent outer edge of the top of the light pole to facilitate assembly of a top closure cap element onto the top portion of the light pole.

* * * * *